United States Patent
Traylor

(10) Patent No.: US 7,994,454 B2
(45) Date of Patent: Aug. 9, 2011

(54) BEVERAGE MATE

(76) Inventor: Randy Traylor, Worthington, MN (US)

(*) Notice: Subject to any disclaimer, the term of this patent is extended or adjusted under 35 U.S.C. 154(b) by 1193 days.

(21) Appl. No.: 11/430,419

(22) Filed: May 9, 2006

(65) Prior Publication Data

US 2007/0261560 A1    Nov. 15, 2007

(51) Int. Cl.
*A47J 36/26* (2006.01)
(52) U.S. Cl. .................................. 219/432; 219/433
(58) Field of Classification Search ............ 99/279–323, 99/275–277, 495, 323.3; 219/385–387, 432–433, 219/528, 529
See application file for complete search history.

(56) References Cited

U.S. PATENT DOCUMENTS

| | | | | |
|---|---|---|---|---|
| 1,157,991 | A * | 10/1915 | Linton | 126/390.1 |
| 1,425,371 | A * | 8/1922 | Desmarest | 126/376.1 |
| 2,194,820 | A * | 3/1940 | Connell et al. | 219/433 |
| 2,516,637 | A * | 7/1950 | McCollum | 219/433 |
| 2,876,634 | A | 3/1959 | Zimmerman et al. | |
| 3,432,641 | A * | 3/1969 | Welke | 219/433 |
| 3,766,975 | A | 10/1973 | Todd | |
| 4,463,664 | A * | 8/1984 | Peace | 99/323.3 |
| 4,789,073 | A | 12/1988 | Fine | |
| 4,827,107 | A * | 5/1989 | Peery | 219/521 |
| 5,077,460 | A * | 12/1991 | Rocha et al. | 219/217 |
| 5,283,420 | A * | 2/1994 | Montalto | 219/432 |
| 5,290,997 | A * | 3/1994 | Lai et al. | 219/218 |
| 5,842,353 | A * | 12/1998 | Kuo-Liang | 62/190 |
| 6,204,485 | B1 * | 3/2001 | Williams | 219/429 |
| 6,314,867 | B1 * | 11/2001 | Russell | 99/323.3 |
| 6,444,956 | B1 * | 9/2002 | Witcher et al. | 219/429 |
| 6,870,135 | B2 * | 3/2005 | Hamm et al. | 219/386 |

* cited by examiner

*Primary Examiner* — Joseph M Pelham
(74) *Attorney, Agent, or Firm* — Galasso & Associates, L.P.

(57) ABSTRACT

Beverage Mate consists of at least some of the following: a base, metal adaptor, power switch, power cord, cold/hot switch, adjustable flanges, heating coil, an external cooling unit and a line connecting the cooling unit to the adjustable flanges. To use Beverage Mate, a person places a beverage between the metal flanges and onto the base, plugs the unit into a cigarette lighter using the adaptor attached to the power cord and activates the power switch. The hot or cold setting is then chosen. If the user selects the hot setting, the heating coil in the base is activated allowing the beverage to heat or remain warm if it is already hot. If the user selects the cold setting, the cooling unit is activated allowing the beverage to cool or remain cool if it is already cold.

2 Claims, 2 Drawing Sheets

BEVERAGE MATE

CROSS-REFERENCE TO RELATED APPLICATIONS

This Non-Provisional patent application does not claim priority to any United States provisional patent application or any foreign patent applications.

FIELD OF THE DISCLOSURE

The disclosures made herein relate generally to the car accessories industry. The invention discussed herein is in the general classification of beverage accessory.

BACKGROUND

Millions of people use their automobiles everyday. Often, a driver wishes to travel with a beverage. Many drivers depend on hot coffee or a cold, caffeinated soft drink to keep them alert and awake during long trips. Unfortunately, hot drinks can quickly become cold and distasteful. Conversely, cold drinks often become warm and undrinkable after extended periods.

Many solutions to these problems have been tried but none adequately address the problems associated with both hot and warm beverages. For example, ice cubes will help keep a drink cold, but are useless to keep drinks warm. Ice cubes also melt and dilute the drink after extended use.

Insulated mugs can help keep a drink hot or cold for a brief period, but are ineffective over extended periods of time. Also, these mugs are useless unless the beverage is already cold or hot when it is poured into the insulated mug.

A coozie is also often used with a cold beverage to keep it cold. A coozie is basically insulated fabric that helps keep a drink cold. However, a coozie is not useful for warm beverages. Coozies are also incapable of cooling a beverage that is not cold already.

Hence, there is a need in the art for an easy to use, affordable and effective device for cooling or warming a beverage and maintaining that temperature for an extended period of time without affecting the chemical makeup of the beverage.

SUMMARY OF THE DISCLOSURE

Beverage Mate is a device with a base, adaptor, power switch, power cord, cold/hot switch, adjustable flanges, heating coil, an external cooling unit and a line connecting the cooling unit to the adjustable flanges.

The principal object of this invention is to provide an easy to use device for cooling and warming a beverage.

Another object of this invention is to provide an affordable device for keeping a hot beverage warm and a cold beverage cool.

Yet another object of this invention is to provide a device for warming and cooling a beverage without interfering with the taste of the beverage.

DETAILED DESCRIPTION OF THE DRAWINGS

Beverage Mate consists of at least some of the following: a base, metal adaptor, power switch, power cord, cold/hot switch, adjustable flanges, heating coil, an external cooling unit and a line connecting the cooling unit to the adjustable flanges.

Figure 1:
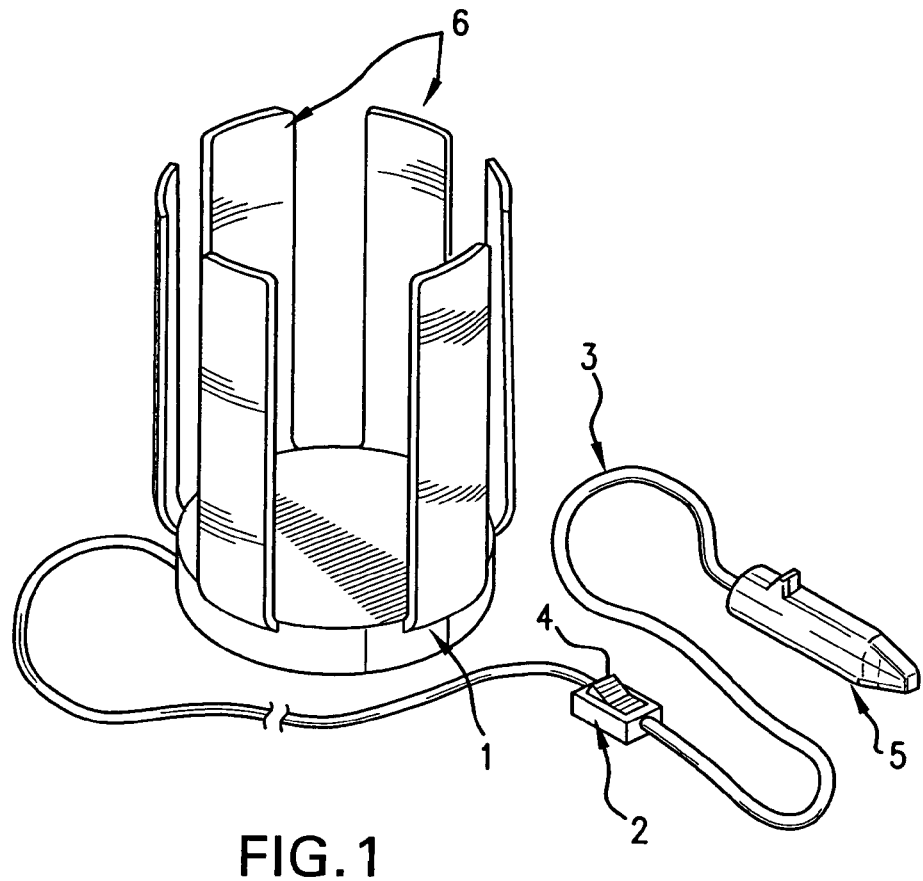
FIG. 1 depicts a perspective view of the preferred embodiment of the present invention.

FIG. 1 depicts a preferred embodiment of the invention. It consists of a metal circular base 1 with a heating coil 30. The heating coil of the base 1 is connected to an insulated power cord 3. The power cord 3 has an on/off switch 2 and a temperature or cold/hot switch 4. Both the on/off switch 2 and the cold/hot switch 4 are made of plastic. On one end of the power cord 3 a metal adapter 5 can be plugged into a cigarette lighter (not picture) to supply power to the heating coil 30. A plurality of metal flanges 6 are arranged around the perimeter of the base 1.

A cooling unit 35 is also attached to the plurality of flanges 6 via a line 37. The line allows cold air emitted from the cooling unit to enter the flanges 6. The cooling unit is also connected to the power cord.

Figure 2:
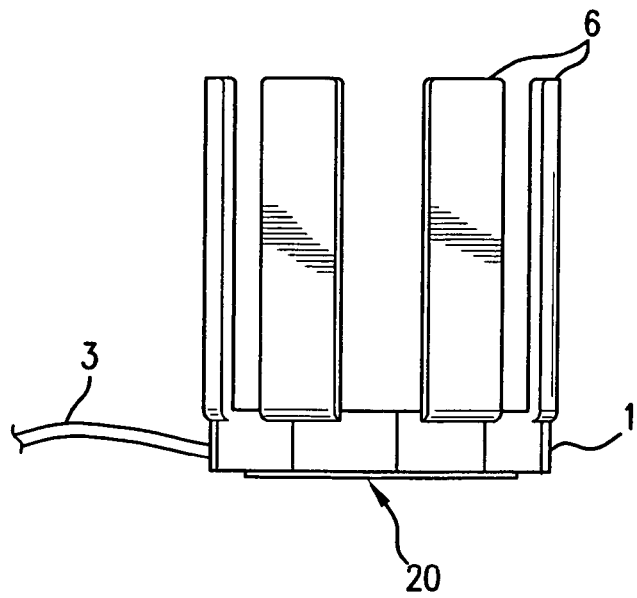
FIG. 2 depicts a side view of the preferred embodiment of the present invention.
Figure 3:
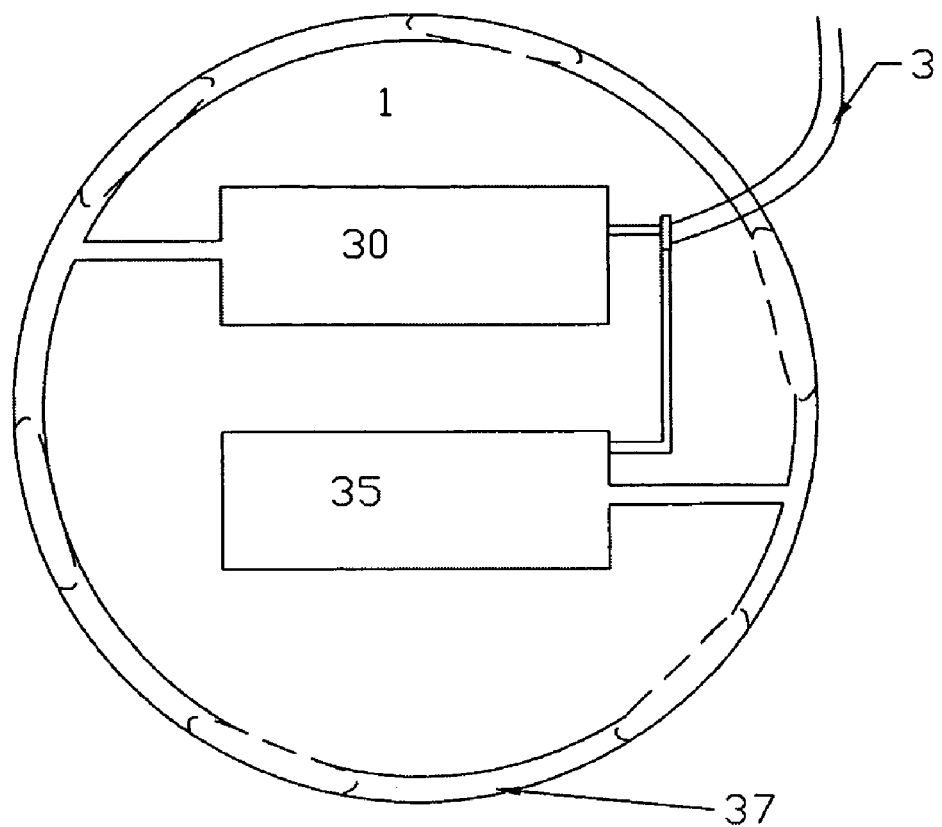
FIG. 3 depicts a bottom view of the preferred embodiment of the present invention.

FIG. 2 depicts a side view of the preferred embodiment of the invention. The base 1 can be seen connected to the power cord 3. A rubber bottom pad 20 is attached to the bottom of the base 1. The plurality of metal flanges 6 is attached to the top of the base 1.

To use Beverage Mate, a person simply places a beverage between the metal flanges and onto the metal base. The unit is plugged into a cigarette lighter using the adaptor attached to the power cord. The user then turns the power switch on and can select either the cold or hot setting on the switch. If the user selects the hot setting, the heating coil in the base is activated allowing the beverage to heat or remain warm if it is already hot. When the hot setting is chosen, the cooling unit is bypassed. When a user no longer desires to heat the beverage, he can simply disconnect the adaptor from the cigarette lighter or turn the power switch to the off position.

If the user selects the cold setting, the cooling unit is activated allowing the beverage to cool or remain cool if it is already cold. When the cold setting is chosen, the heating element is bypassed. The cooling unit operates in a similar manner to refrigerators and air conditioners, as is well known in the art. An evaporation cycle in the cooling unit operates when a compressor compresses cool Freon gas, causing it to become hot, high-pressure Freon gas. This hot gas runs through a set of coils so it can dissipate its heat, and it condenses into a liquid. The Freon liquid then runs through an expansion valve, and in the process it evaporates to become cold, low-pressure Freon gas. This cold gas runs through a set of coils. Fans can blow over the hot compressor coils to dissipate heat and over the cold evaporator coils to distribute cool air to the line connected to the metal flanges. When a user is finished with the device, he can use the power switch to deactivate the unit or remove the adaptor from the cigarette lighter.

The components of Beverage Mate may vary widely but will likely utilize metal, plastic and electrical components. The metals would ideally be selected from available steel or alloys of steel and aluminum. The production process related to the use of these metals insures that the metal is non-corrosive, durable and strong. The selected metal should have high impact strength and be capable of accepting and retaining coloring materials for an extended length of time.

The plastic used in the production will ideally be selected for durability and longevity. Thermoplastics are commonly used in the manufacturing of components similar to those used in this invention. Polyethylene, polypropylene, and other similar thermoplastic materials would be among those with the necessary traits. Members of this family are recognized universally as being versatile and of high quality.

The plastic components of Beverage Mate can also be formed with the use of plastic molding techniques, such as injection molding or blow molding. Injection molding requires melted plastic to be forcefully injected into relatively cool molds. As the plastic begins to harden, it takes on the shape of the mold cavity. This technique is ideal for the mass production of products. Alternatively, blow molding, a form of extrusion, could be utilized. Blow molding involves a molten tube being pushed into a mold. Compressed air then forces the molten tube against the cold walls of the mold.

All electronic components of the invention will also be ideally selected from those currently having the highest industry ratings. These components will also meet and/or exceed all safety and usage regulations. Wiring and associated connecting hardware should be insulated and otherwise protected from intrusion by any harmful or degrading elements, including water, medium level temperatures, and low to medium impact force.

The size of Beverage Mate may vary widely. It will be designed to accommodate many different sized drinks. The preferred embodiment has a roughly four inch diameter base that is three-quarters of an inch thick and the flanges stretch approximately six inches in height.

It should be obvious that any suitable materials could be used for the switches, base, flanges or bottom pad of the present invention. It should further be obvious that the power switch or temperature switch could be located on the base or other suitable location rather than on the power cord. It should also be obvious that a pronged power plug for use with a standard wall outlet could replace the metal adaptor at one end of the power cord.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A beverage accessory device comprising:
   (a) a circular base with a plurality of flexible metal flanges around a top perimeter of the circular base; said flanges approximately six inches in height and operable to receive a beverage container and wherein said flanges are heated;
   (b) a heating coil within the base;
   (c) a power cord attached to the base; and
   (d) a rubber pad attached to the bottom of the base.

2. A beverage accessory device comprising:
   (a) a circular and metal base with a plurality of flexible metal flanges attached around a top perimeter of the circular and metal base and a rubber pad on the bottom of the circular and metal base; wherein said flexible metal flanges are approximately six inches in height and are operable to be heated or cooled;
   (b) a heating coil within the circular and metal base;
   (c) an insulated power cord having a plastic power switch and a plastic temperature switch attached to the circular and metal base;
   (d) a metal adaptor attached to the insulated power cord; and
   (e) a cooling unit attached to the insulated power cord and the plurality of metal flanges via a line.

* * * * *